United States Patent
Sakai

(10) Patent No.: US 7,009,509 B2
(45) Date of Patent: Mar. 7, 2006

(54) OCCUPANT WEIGHT DETECTING DEVICE

(75) Inventor: Morio Sakai, Toyota (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 166 days.

(21) Appl. No.: 10/445,207

(22) Filed: May 27, 2003

(65) Prior Publication Data
US 2004/0006418 A1 Jan. 8, 2004

(30) Foreign Application Priority Data
May 24, 2002 (JP) .............................. 2002-150977

(51) Int. Cl.
*B60Q 1/00* (2006.01)
*B60R 21/00* (2006.01)

(52) U.S. Cl. .................. 340/457.1; 340/438; 340/667; 180/268; 180/271; 280/735; 701/45; 701/124

(58) Field of Classification Search ............ 340/457.1, 340/438, 665, 667; 280/734, 735; 180/268, 180/271; 701/1, 45, 124; 382/103, 104
See application file for complete search history.

(56) References Cited

U.S. PATENT DOCUMENTS

| 6,158,768 A | * | 12/2000 | Steffens et al. .............. 280/735 |
| 6,223,606 B1 | * | 5/2001 | Burke et al. ........... 73/862.041 |
| 6,609,054 B1 | * | 8/2003 | Wallace ........................ 701/45 |
| 6,662,138 B1 | * | 12/2003 | Takafuji et al. ............. 702/173 |

FOREIGN PATENT DOCUMENTS

JP 9-207638 A 8/1997

* cited by examiner

*Primary Examiner*—Donnie L. Crosland
(74) *Attorney, Agent, or Firm*—Buchanan Ingersoll PC

(57) ABSTRACT

An occupant weight detecting device includes a load detector provided at a seat body and detecting load applied to the seat body and an occupant detector for detecting an occupant sitting on the seat body based on the load detected by the load detector. The occupant detector includes a load calculator for calculating the load based on a detected value detected by the load detector, a load area determination device for determining a load area by comparing the load with a predetermined threshold, and an occupant determination device for determining a type of occupant sitting on the seat body based on the load area.

5 Claims, 7 Drawing Sheets

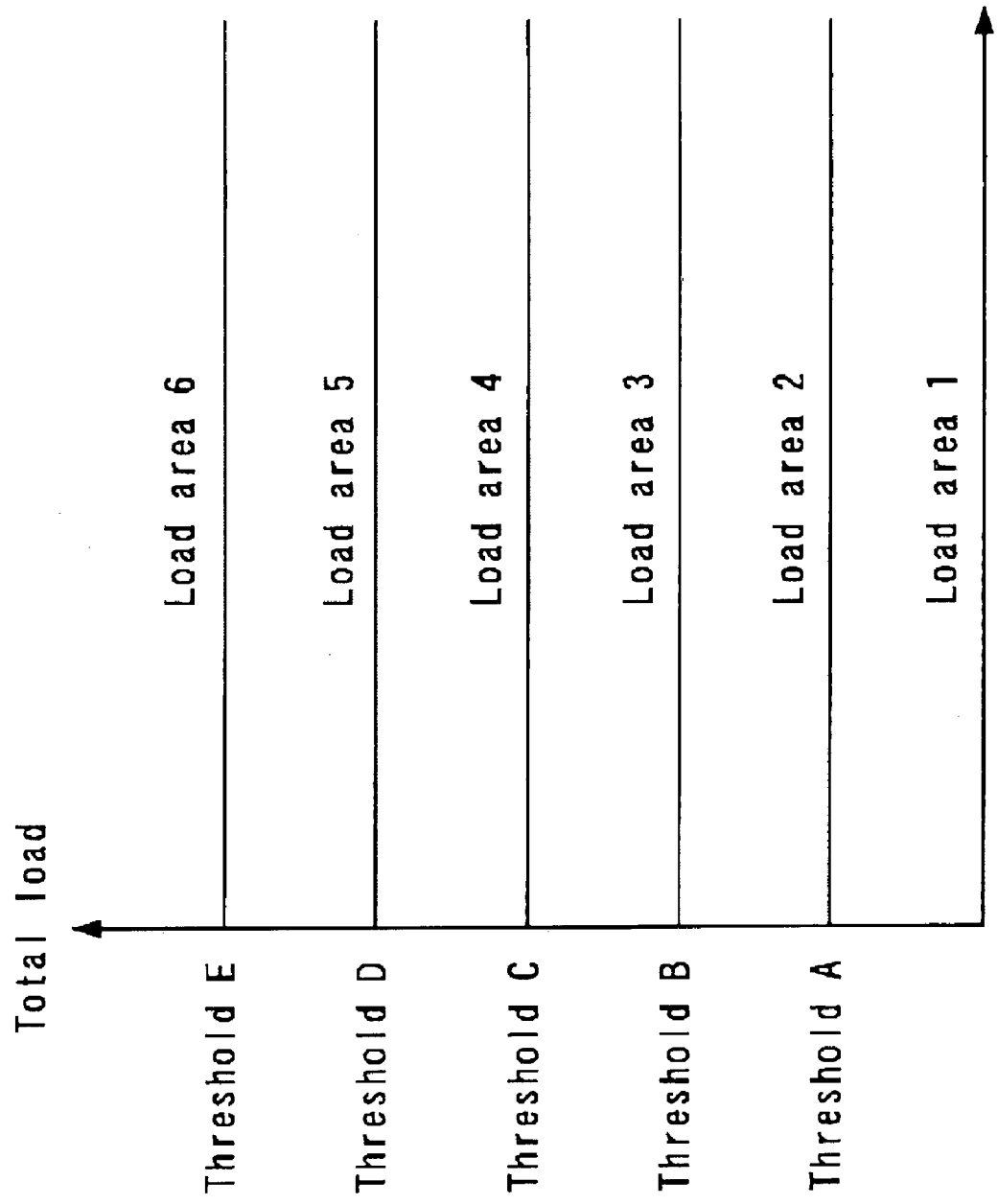

OCCUPANT WEIGHT DETECTING DEVICE

CROSS REFERENCE TO RELATED APPLICATIONS

The application is based on and claims priority under 35 U.S.C. § 119 with respect to a Japanese Patent Application 2002-150977, filed on May 24, 2002, the entire content of which is incorporated herein by reference.

FIELD OF THE INVENTION

This invention generally relates to an occupant weight detecting device which detects an occupant sitting on a seat. More particularly, this invention pertains to an occupant weight detecting device which actuates a safety device in response to a type of an occupant determined in a series of process for detecting the occupant.

BACKGROUND OF THE INVENTION

Recently, in a vehicle, an air bag device, which is one of a safety device, has become a standard equipment in order to ensure safety of an occupant in case of a traffic accident. An impact generated on the vehicle by a collision is detected by a G-sensor. Based on a signal from the G-sensor, an operating signal for operating the air bag device is inputted to the air bag device which is provided in the center of a steering wheel for a driver or a dashboard panel of a passenger seat. When the operating signal is inputted to the air bag device, an inflator accommodated in the air bag device is ignited. By this ignition, gas for inflating the air bag is expanded. Then the air bag is quickly inflated by the gas, and the occupant sitting on a front seat is protected.

When the air bag device has to be accurately controlled, a type of the occupant sitting on the seat ("adult", "child", or "no occupant") needs to be determined accurately. For example, a known occupant weight detecting device is disclosed in a Japanese Patent Laid-Open Publication No. 9-207638. The occupant weight detecting device has four load detecting sensors for detecting weight of an occupant sitting on a seat. Based on output load values detected by the four load detecting sensors, load detection value is calculated by CPU. Then the type of the occupant sitting on the seat is determined by comparing the load detection value with each predetermined threshold.

However, in the occupant weight detecting device disclosed in the foregoing publication, the occupant determination transaction is performed according to a program including plural subroutines, and accordingly the program becomes long and complicated. This longer and complicated program is not preferable since this may allow a coding error and a bug.

The present invention therefore seeks to provide an occupant weight detecting device transacted by a relatively shorter program for determining a type of an occupant than a conventional program and preventing generation of a coding error and a bug.

SUMMARY OF THE INVENTION

According to an aspect of the present invention, an occupant weight detecting device includes a load detecting means provided at a seat body and detecting load applied to the seat body and an occupant detecting means for detecting an occupant sitting on the seat body based on the load detected by the load detecting means. The occupant detecting means includes a load calculation means for calculating the load based on a detected value detected by the load detecting means, a load area determination means for determining a load area by comparing the load with a predetermined threshold, and an occupant determination means for determining a type of the occupant sitting on the seat body based on the load area.

According to another aspect of the present invention, an occupant weight detecting device includes plural load detecting means provided at a seat body and detecting load applied to the seat body and an occupant detecting means for detecting an occupant sitting on the seat body based on the load detected by the plural load detecting means. The occupant detecting means calculates total load applied to the seat body based on detected values detected by the plural load detecting means and determines a type of the occupant sitting on the seat body based on a load area predetermined in response to largeness of the total load.

BRIEF DESCRIPTION OF THE DRAWING FIGURES

The foregoing and additional features and characteristics of the present invention will become more apparent from the following detailed description considered with reference to the accompanying drawing figures wherein:

FIG. 3(*b*) is a perspective view of a rear sensor bracket provided on lateral sides of the seat shown in FIG. 1;

FIG. 8 is a chart describing a load area classified in response to largeness of total load detection value.

DETAILED DESCRIPTION OF THE INVENTION

Figure 1:
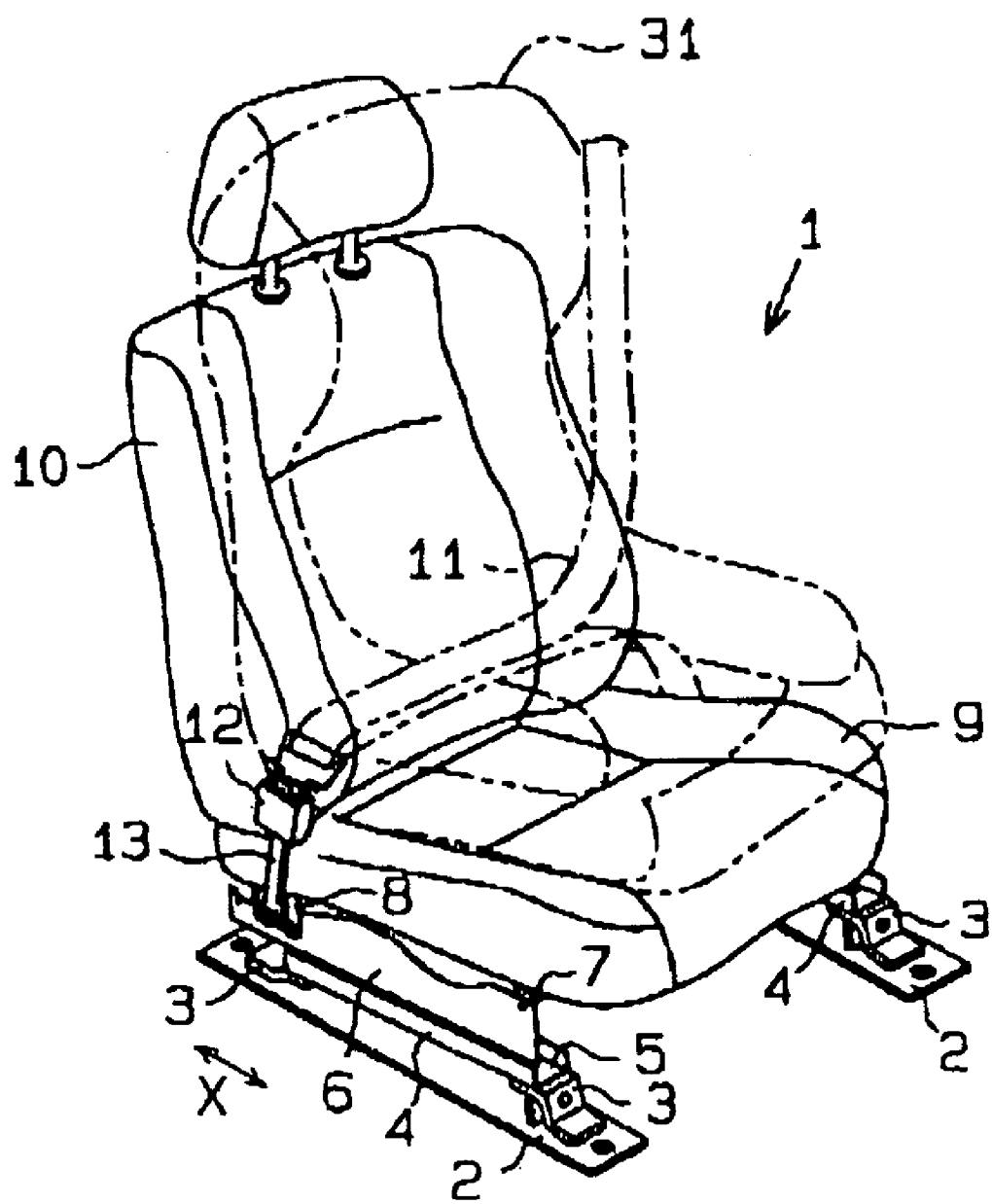
FIG. 1 is perspective view of a seat according to an embodiment of the present invention.

As shown in FIG. 1, a seat body 1 according to an embodiment of the present invention is provided, for example, as a front seat of a vehicle. A pair of supporting frames 2 is fixed to a vehicle floor (not shown) and extends in a longitudinal direction of the vehicle ("X" arrow shown in FIG. 1). The seat body 1 is mounted on the vehicle floor through the pair of supporting frames 2.

A pair of brackets 3 is fixed to each supporting frame 2 on front and rear portions thereof, and a lower rail 4 is fixed to the pair of the brackets 3 along the supporting frame 2. The lower rail 4 has an approximately U-shaped cross section with an upward opening. The opening extending in the longitudinal direction of the vehicle forms a slide groove 5.

Figure 2:
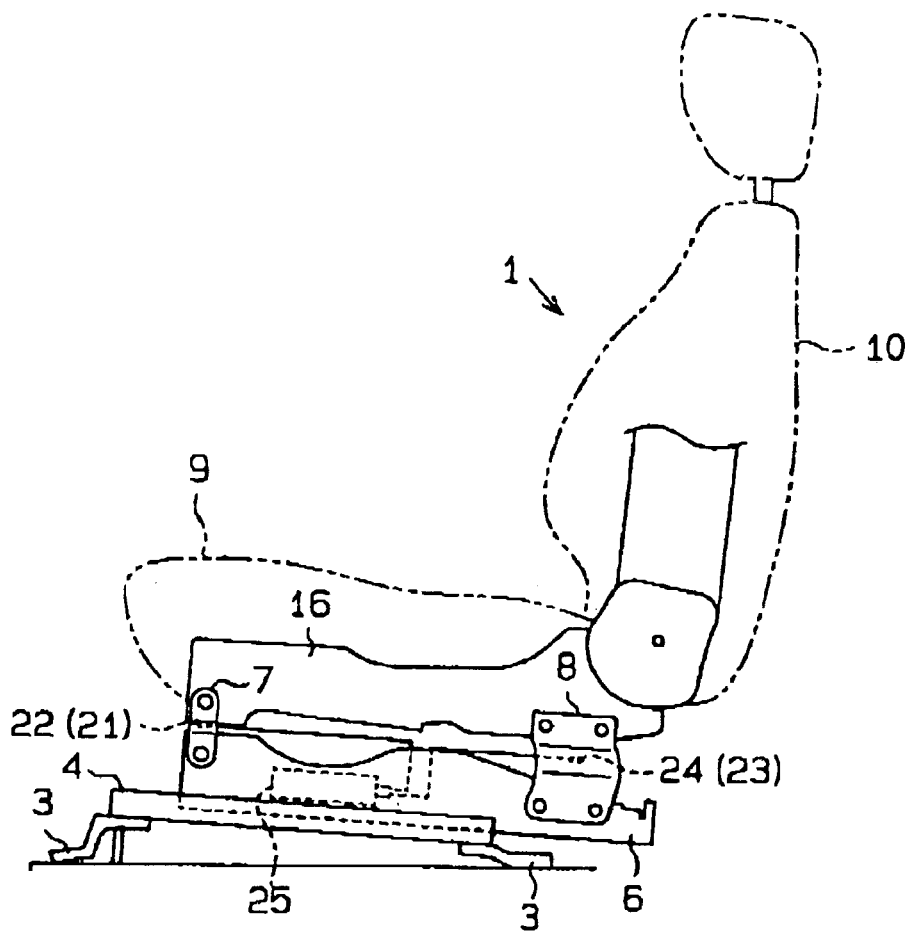
FIG. 2 is a lateral view of the seat shown in FIG. 1.

A pair of upper rails 6 is accommodated in the slide grooves 5 of the lower rails 4 so as to be slidably movable in the longitudinal direction of the vehicle in the slide grooves 5. As shown in FIG. 2, each upper rail 6 has a front sensor bracket 7 and a rear sensor bracket 8. A pair of lower arms 16, which supports a seat cushion 9 and a seat back 10, is connected to the pair of upper rails 6 by using the front sensor brackets 7 and the rear sensor brackets 8.

Figure 3A:
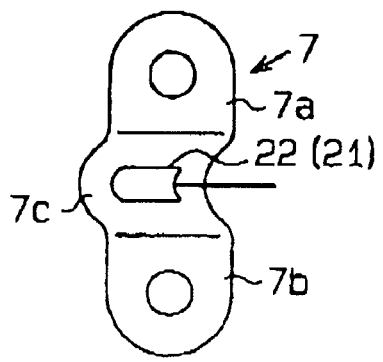
FIG. 3(*a*) is a perspective view of a front sensor bracket provided on lateral sides of the seat shown in FIG. 1.
Figure 3B:
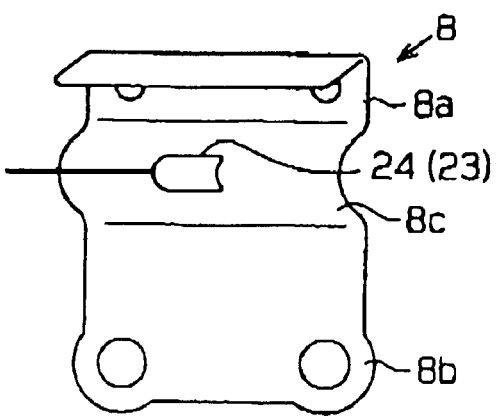

As shown in FIG. 3(*a*), the front sensor bracket 7 of each upper rail 6 is provided with an upper fastening portion 7*a* and a lower fastening portion 7*b*. Further, a flexible portion 7*c*, which is located between the upper fastening portion 7*a* and the lower fastening portion 7*b* with being curved, is provided with the front sensor bracket 7. The upper fastening portion 7*a* and the lower fastening portion 7*b* are respectively fixed to a front side of the lower arm 16 and a front side of the upper rail 6. The flexible portion 7*c* of each front sensor bracket 7 is provided with a load detecting sensor, that is a front right-hand side sensor 21 (a load detecting means, hereinafter referred to as a load detecting sensor 21) and a front left-hand side sensor 22 (a load detecting means, hereinafter referred to as a load detecting sensor 22). Generally, a strain detecting element such as a strain gauge is applied to these load detecting sensors 21 and 22. The load detecting sensors 21 and 22 can detect a flexible amount of the flexible portion 7*c* In response to load applied to the seat cushion 9.

On one hand, as shown in FIG. 3(*b*), the rear sensor bracket 8 of each upper rail 6 is also provided with an upper fastening portion 8*a* and a lower fastening portion 8*b* as same with the front sensor bracket 7. A flexible portion 8*c*, which is located between the upper fastening portion 8*a* and the lower fastening portion 8*b* with being curved, is provided with the rear sensor bracket 8. The upper fastening portion 8*a* and the lower fastening portion 8*b* are respectively fixed to a rear side of the lower arm 16 and a rear side of the upper rail 6. The flexible portion 8*c* of each rear sensor bracket 8 is provided with a load detecting sensor, that is a rear right-hand side sensor 23 (a load detecting means, hereinafter referred to as a load detecting sensor 23) and a rear left-hand side sensor 24 (a load detecting means, hereinafter referred to as a load detecting sensor 24). The strain detecting element such as the strain gauge is applied to these load detecting sensors 23 and 24 as same with the load detecting sensors 21 and 22. The load detecting sensors 23 and 24 can detect a flexible amount of the flexible portion 8*c* in response to load applied to the seat cushion 9.

As shown in FIG. 1, an anchor bracket 13 is connected to the upper rail 6 at one side of the seat body 1 and has a belt anchor 12. A seat belt 11 provided in the vehicle is connected to the belt anchor 12.

An occupant weight detecting device 20 according to the invention can be applied to an air bag device including an air bag ECU 30 (hereinafter referred to as an A/B ECU 30) and an inflator 32. The inflator 32, which is controlled by the A/B ECU 30, is provided, for example, in the center of a steering wheel for a driver or a dashboard panel of a passenger seat. The inflator 32 inflates an air bag (not shown) in case of a collision. An inflating amount of the air bag is controlled by the A/B ECU 30 in response to a type of an occupant ("adult", "child", or "no occupant"). The type of the occupant has been predetermined by the occupant weight detecting device 20. The foregoing system structure including the air bag device is explained below with reference to FIG. 4.

Figure 4:
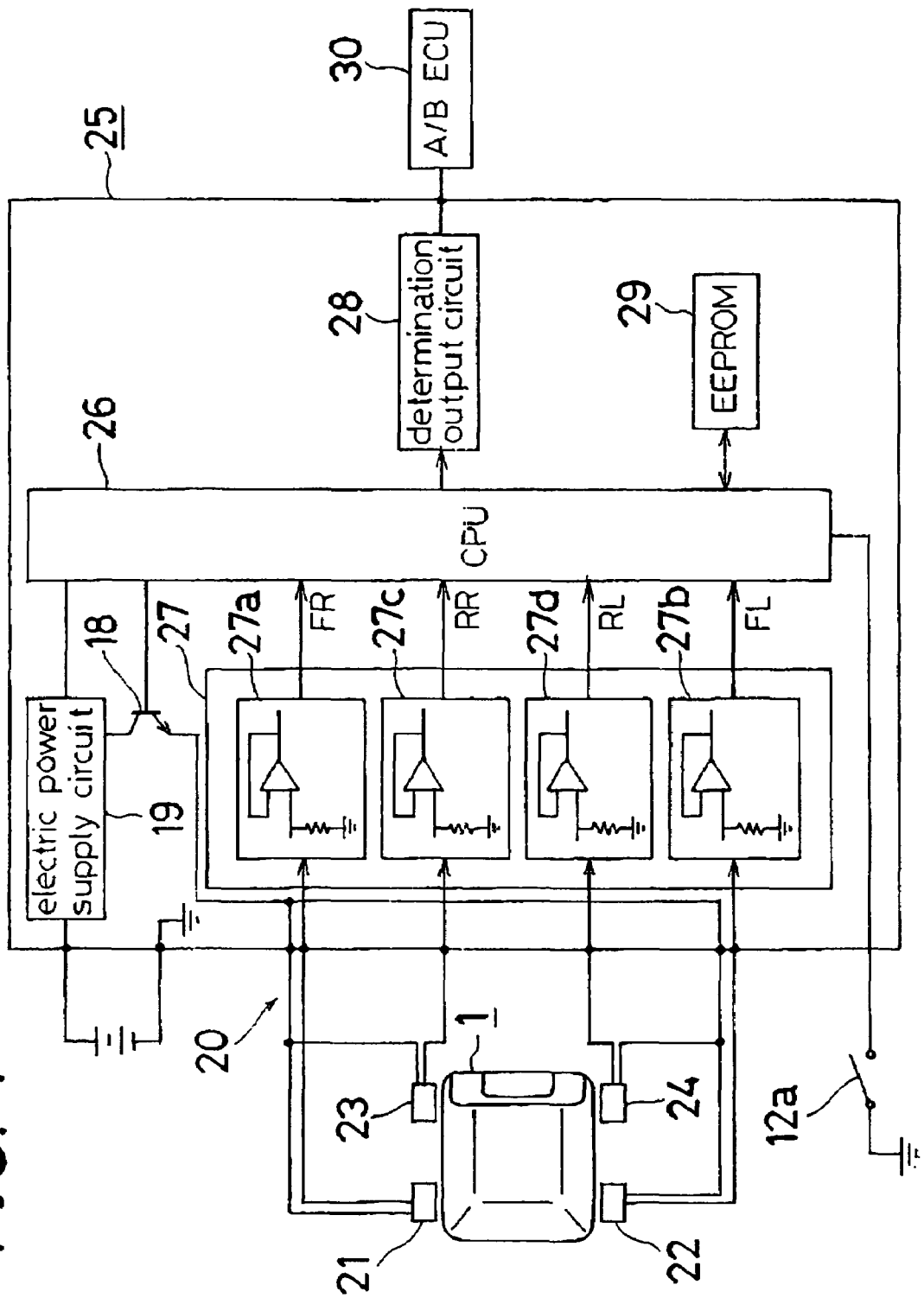
FIG. 4 is a system diagram of an occupant weight detecting device applied to an air bag control device according to the embodiment of the present invention.

As shown in FIG. 4, the system has the load detecting sensors 21–24 provided at a predetermined position of the seat body 1 and a seat belt switch 12*a* provided at the belt anchor 12. Further, the system has a controller 25 which transmits an operating command to the A/B ECU 30 in response to the type of the occupant sitting on the seat body 1.

The seat belt switch 12*a* is turned on by fixing of the seat belt 11 to the belt anchor 12 and otherwise, turned off. A detection signal from the seat belt switch 12*a* is inputted to the controller 25. The controller 25 can detect the fixing state of the seat belt 11 based on the detection signal.

The controller 25 has CPU 26, an electric power supply circuit 19 for supplying a predetermined electric power (for example, Vcc=5V), a sensor signal input circuit 27, and a determination output circuit 28 therein. The controller 25 further has a switching element 18 and a non-volatile memory (EEPROM) 29 (hereinafter referred to as a memory 29) therein. The switching element 18 supplies or shuts off the electric power to the load detecting sensors 21–24 based on a command from the CPU 26, and the memory 29 can hold a memorized state even if the electric power is not supplied to the controller 25.

The sensor signal input circuit 27 has active filters 27*a*, 27*b*, 27*c*, and 27*d*. Load signals (a detected value) detected by the load detecting sensors 21–24 are inputted to the active filters 27*a*–27*d* respectively. The load signals are inputted to the CPU 26 through the active filters 27*a*–27*d*. The active filters 27*a*–27*d*, which includes passive elements such as condensers and resistances combined with active elements such as an amplifier, are well-known filters. With reference to the load signals detected by the load detecting sensors 21–24, only the load signals with lower frequency can pass through the active filters 27*a*–27*d*.

Based on the load signals from the load detecting sensors 21 and 22 passing through the active filters 27*a* and 27*b*, load detection value FR of the load detecting sensor 21 and load detection value FL of the load detecting sensor 22 are calculated by the CPU 26. Correspondingly, load detection value RR of the load detecting sensor 23 and load detection value RL of the load detecting sensor 24 are calculated by the CPU based on the load signals from the load detecting sensors 23 and 24 passing through the active filters 27*c* and 27*d*. A total load detection value (hereinafter referred to as a total load) as the load detection value is calculated by the sum of the load detection values FR, FL, RR, and RL.

The CPU 26 performs the calculation based on a predetermined program memorized therein, and the calculation result is inputted to the determination output circuit 28. Then, a driving signal for inflating the air bag is transmitted to the A/B ECU 30. The inflating amount of the air bag is controlled by the A/B ECU 30 in response to the type of the occupant determined by the CPU 26.

In the embodiment, the CPU 26 functions as an occupant detecting means for detecting an occupant sitting on the seat body 1, a load calculation means for calculating load applied to the seat body 1, a load area determination means for determining a load area, and an occupant determination means for determining the occupant sitting on the seat body 1.

In the occupant weight detecting device 20, a child restraint system 31 (hereinafter referred to as a CRS 31), which is called "child seat", can be mounted to the seat body 1 in order to protect a child in case of the collision. The CRS 31 is generally mounted to the seat body 1 by using the seat belt 11 as shown in FIG. 1 with a double-dashed line. When the CRS 31 is mounted to the seat body 1, the following operation is needed.

More specifically, when the CRS 31 is mounted on a sitting part formed by the seat cushion 9 and the seat back 10, the CRS 31 is initially set on the seat cushion 9. Since the CRS 31 weighs several kilograms, which is lighter than weight of the adult, the total load is relatively small value compared to the total load corresponding to the adult. Next, the seat belt 11 is put through a mounting hole provided with the back of the CRS 31, the seat belt 11 is connected to the belt anchor 12, then the CRS 31 is temporarily fixed. In this case, since the CRS 31 is not fixed tightly to the seat body 1 by the seat belt 11, the total load is relatively small value. When the child sits on the seat body 1, the foregoing state is similarly shown.

After that, in order to fix the CRS 31 firmly to the seat body 1, the seat belt 11 is fastened with the CRS 31 being pressed tightly to the seat body 1. In the foregoing process of the mounting of the CRS 31, the total load significantly varies. Consequently, the mounting of the CRS 31 can be recognized by detecting variation of load or variation of the total load in a series of the mounting process.

Next, transaction performed by the CPU 26 included in the controller 25 is explained below with reference to a flow chart shown in FIG. 5. In the following explanation, "step" at each transaction is referred to as "S".

Figure 5:
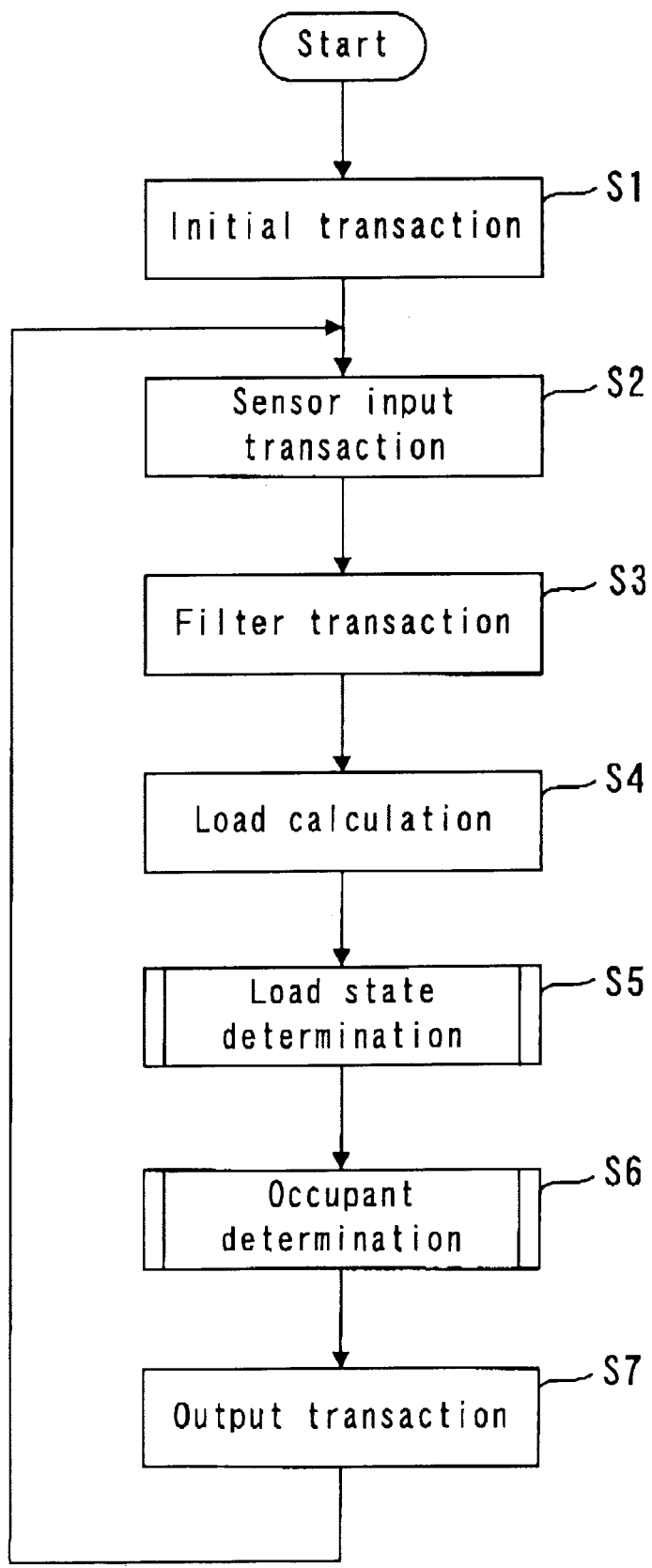
FIG. 5 is a flow chart describing a series of the transaction of CPU shown in FIG. 4.

When the electric power from a battery is initially supplied to the CPU 26, or when the CPU 26 is reset, a program shown in FIG. 5 performs the transaction from S1. Initial transaction at S1, the CPU 26 checks whether or not an inside memory can normally memorize an inputted data. Then the CPU 26 sets an initial value to the memory 29. The initial value is needed in order to perform the transaction subsequently. Further, in the initial transaction, the CPU 26 checks whether or not the air bag device including the controller 25 and the A/B ECU 30 can normally operate.

After that, the electric power is supplied to the detecting sensors 21–24 by operating the switching element 18, and sensor input transaction is performed at S2. At S2, sensor voltage values detected by the load detecting sensors 21–24 is inputted to the controller 25. At S3, filter transaction is performed. Previous load detection values detected by the load detecting sensors 21–24 have been memorized to the memory 29. In the filter transaction at S3, the CPU 26 calculates filtered load detection values by multiplying previous load detection values and current load detection values by a weighting factor. Then, the CPU 26 performs load calculation at S4.

At S4, the total load is calculated based on the load detection values FR, FL, RR, and RL detected by the load detecting sensors 21–24, then memorized to the memory 29. After that, load state is determined at S5 based on the total load calculated by the load calculation at S4, and then an occupant determination is performed at S6. Next, the CPU 26 performs output transaction at S7. At S7, the CPU 26 outputs the driving signal to the A/B ECU 30 with the inflating amount of the air bag controlled based on the type of the occupant ("adult", "child", or "no occupant"). The foregoing transactions from S2 to S7 are repeated with a predetermined cycle.

Figure 6:
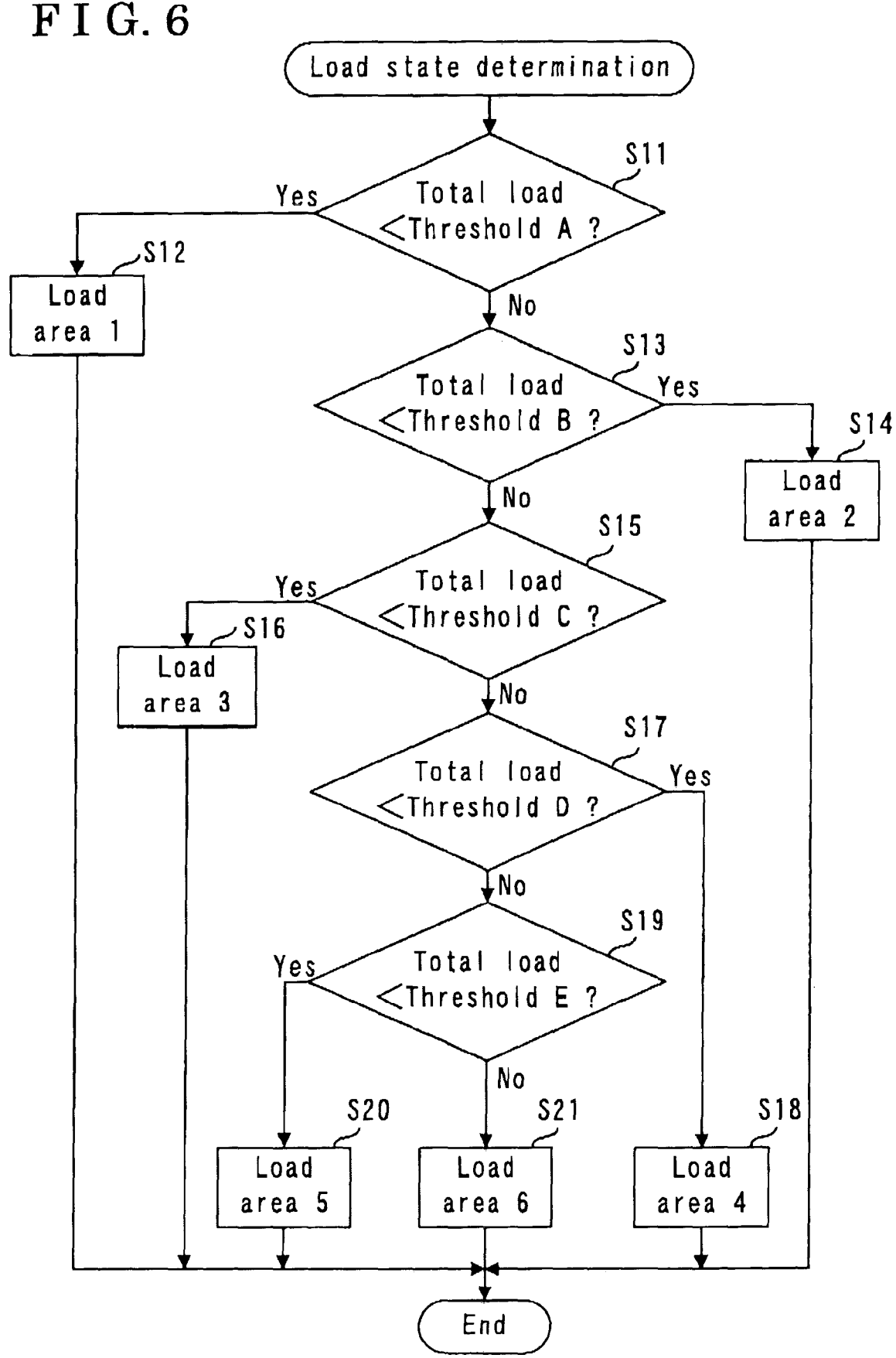
FIG. 6 is a flow chart describing a load state determination shown in FIG. 5.

Next, load state determination at S5 shown in FIG. 5 is explained below with reference to FIG. 6. At this load state determination at S5, the total load calculated by the load calculation at S4 is coded as load areas based on largeness of the total load. More specifically, as shown in FIGS. 6 and 8, transaction at S11 determines whether or not the total load is smaller than the smallest threshold A. If the total load is the threshold A or more at S11, the transaction proceeds to S13. If the total load is smaller than the threshold A, the load area, which is classified in response to the largeness of the total load, is set as a load area "1" at S12. This state is memorized to the memory 29, and this load state determination is ended.

Transaction at S13 determines whether or not the total load is smaller than a threshold B (larger than the threshold A). If the total load is the threshold B or more, the transaction proceeds to S15. If the total load is smaller than the threshold B, the load area is set as a load area "2" at S14. This state is memorized to the memory 29, and this load state determination is ended.

Next, transaction at S15 determines whether or not the total load is smaller than a threshold C (larger than the threshold B). If the total load is the threshold C or more, the transaction proceeds to S17. If the total load is smaller than the threshold C, the load area is set as a load area "3" at S16. This state is memorized to the memory 29, and this load state determination is ended.

Additionally, transaction at S17 determines whether or not the total load is smaller than a threshold D (larger than the threshold C). If the total load is the threshold D or more, the transaction proceeds to S19. If the total load is smaller than the threshold D, the load area is set as a load area "4" at S18. This state is memorized to the memory 29, and this load state determination is ended.

Transaction at S19 determines whether or not the total load is smaller than a threshold E (larger than the threshold D). If the total load is the threshold E or more, the transaction proceeds to S21, and the load area is set as a load area "6" at S21. On one hand, if the total load is smaller than the threshold E at S19, the load area is set as a load area "5" at S20. These states are memorized to the memory 29, and this load state determination is ended.

As explained above, in a series of the transaction of the load state determination, the CPU 26 calculates the total load by the sum of the load detection values detected by the load detecting sensors 21–24. The load areas "1, 2, 3, 4, 5 and 6" shown in FIG. 8 corresponding to the total load are determined in response to the largeness of the total load. That is, the CPU 26 classifies the load state by simple comparing the total load with the thresholds "A, B, C, D, and E".

Figure 7:
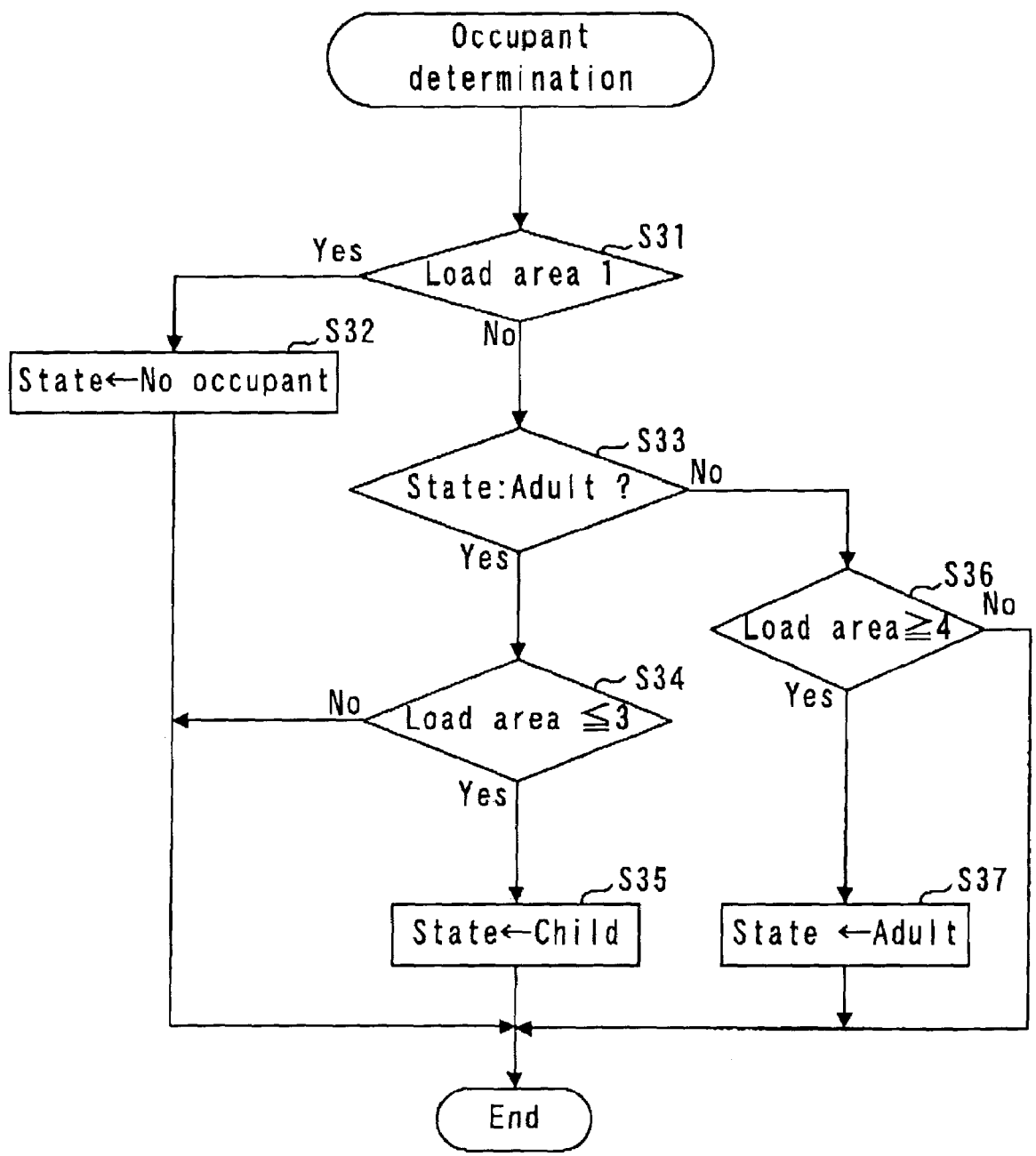
FIG. 7 is a flow chart describing an occupant determination shown in FIG. 5.

Next, occupant determination at S6 shown in FIG. 5 is explained below with reference to FIG. 7. In the occupant determination at S6, the type of the occupant ("adult", "child", or "no occupant") is determined based on the load area predetermined at S5. More specifically, transaction at S31 initially determines whether or not the load area is "1". If the load area set at S5 is not "1", the transaction proceeds to S33. If the load area is "1", the total load is regarded as a small load which does not correspond to the occupant. Then, after a flag or a predetermined constant showing "no occupant" is memorized to the memory 29 at S32, the occupant determination is ended.

If the load area is not "1", the CPU 26 determines a current occupant state based on a previous occupant state having been memorized to the memory 29 at S33. More specifically, at S33, if a flag or a predetermined constant except a flag or a predetermined constant showing "adult" has been memorized to the memory 29, the transaction proceeds to S36. Transaction at S36 determines whether or not the load area is "4" or more. If the load area is not "4" or more at S36, this occupant determination is ended with the previous occupant state being held. If the load area is "4" or more, the total load is regarded as the total load corresponding to "adult". Then, after the flag or the predetermined constant showing "adult" is memorized to the memory 29 at S37, this occupant determination is ended.

On one hand, if the flag or the predetermined constant showing "adult" has been memorized to the memory 29 at S33, the transaction proceeded to S34 and determines whether or not the load area is "3" or less. If the load area is not "3" or less at S34, this occupant determination is ended with the previous occupant state being held. If the load area is "3" or less, this occupant determination is ended after a flag or a predetermined constant showing "child" is memorized to the memory 29 at S35.

As described above, in the foregoing occupant determination, the type of the occupant ("adult", "child", or "no occupant") is determined in response to the load areas "1, 2, 3, 4, 5, and 6" predetermined based on the largeness of the total load at S5 shown in FIG. 6. Thus, in a series of the transaction of the occupant determination, the transaction with the determination based on the largeness of the total load does not need to be performed redundantly, and length of a program for performing a series of the transaction can be shortened as compared to that of a program with plural subroutines for performing the determination based on the largeness of the total load. Consequently, generation of a bug in the program can be prevented.

In the embodiment described above, the inflator 32 for inflating the air bag and the A/B ECU 30 are respectively applied to a safety device and a control device for controlling the safety device. However, an embodiment according to the present invention does not limited to the embodiment described above, the occupant weight detecting device 20 can be applied to a safety device such as a pinching detecting device for a vehicle roof, sunroof, slide door.

Further, in the embodiment, at the beginning of each subroutine, necessity of performing the transaction to be performed at each subroutine can be determined by the predetermined constant set as the load area. Thus, only the transaction at necessary subroutine can be performed, the generation of the bug in the program can be prevented. Further, maintenance in case of change in the program becomes easy.

According to the present invention, if once the load area is predetermined based on the largeness of the total load in a series of transaction calculated with the predetermined cycle, the transaction with the determination based on the largeness of the total load does not need to be performed redundantly. Consequently, the length of the program for performing a series of the transaction can be shortened as compared to that of the program with the plural subroutines for performing the determination based on the largeness of the total load, the generation of a coding error or the bug in the program can be prevented. Further, the maintenance in case of change in the program becomes easy.

Additionally, if the safety device operating in response to the type of the occupant and the control device for controlling the safety device are provided, the control device can control the safety device in response to the type of the occupant. Thus the safety of the occupant can be further improved.

The principles, preferred embodiments and mode of operation of the present invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

I claim:

1. An occupant weight detecting device, comprising:
   a load detecting means provided at a seat body and detecting load applied to the seat body; and
   an occupant detecting means for detecting an occupant sitting on the seat body based on the load detected by the load detecting means, wherein the occupant detecting means includes a load calculation means for calculating the load based on a detected value detected by the load detecting means, a load area determination means for determining that the load is within one a load area of a plurality of different load areas by comparing the load with a predetermined threshold, the different load areas being distinguished from one another based on a largeness of the load, and an occupant determination means for determining a type of the occupant sitting on the seat body based on the one load area determined by the load area determination means.

2. An occupant weight detecting device, according to claim 1, wherein a safety device operating in response to the type of the occupant and controlled by a control device is applied to the occupant weight detecting device.

3. An occupant weight detecting device, comprising:
   plural load detecting means provided at a seat body and detecting load applied to the seat body; and
   an occupant detecting means for detecting an occupant sitting on the seat body based on the load detected by the plural load detecting means, wherein the occupant detecting means calculates total load applied to the seat body based on detected values detected by the plural load detecting means and determines a type of the occupant sitting on the seat body based on the total load being within one load area of a plurality of different load areas, the different load areas being predetermined and distinguished from one another based on a largeness of the total load.

4. An occupant weight detecting device, according to claim 3, wherein a safety device operating in response to the type of the occupant and controlled by a control device is applied to the occupant weight detecting device.

5. An occupant weight detecting device, according to claim 4, wherein the safety device is an air bag including device for inflating an air bag device, and the control device controls an inflating amount of the air bag in response to the type of the occupant.

* * * * *